US009823088B2

(12) United States Patent
Delaruelle

(10) Patent No.: US 9,823,088 B2
(45) Date of Patent: Nov. 21, 2017

(54) CUSTOM NAVIGATIONAL DATA BASED ON USER RECOGNITION

(71) Applicant: Ford Global Technologies, LLC, Dearborn, MI (US)

(72) Inventor: Aurelien Pierre Christian Delaruelle, Fairfield (AU)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/715,954

(22) Filed: May 19, 2015

(65) Prior Publication Data

US 2016/0341567 A1 Nov. 24, 2016

(51) Int. Cl.
*G06F 19/00* (2011.01)
*G01C 21/36* (2006.01)
*G06K 9/00* (2006.01)

(52) U.S. Cl.
CPC ..... *G01C 21/3691* (2013.01); *G06K 9/00832* (2013.01)

(58) Field of Classification Search
CPC ............ G01C 21/3691; G01C 21/3667; G06K 9/00288; G06K 9/00845
USPC ........ 701/117, 207, 35, 36; 340/5.53, 426.1; 707/758; 180/287, 257
See application file for complete search history.

(56) References Cited

U.S. PATENT DOCUMENTS

| | | | | |
|---|---|---|---|---|
| 5,812,067 A * | 9/1998 | Bergholz | ................ | B60R 25/04 180/257 |
| 6,721,655 B1 * | 4/2004 | Utsumi | .............. | G01C 21/3415 340/995.1 |
| 6,831,993 B2 * | 12/2004 | Lemelson | ............ | B60Q 1/0023 307/10.5 |
| 8,781,716 B1 * | 7/2014 | Wenneman | ........ | G01C 21/3484 701/118 |
| 8,880,291 B2 * | 11/2014 | Hampiholi | .............. | B60R 25/25 455/404.1 |
| 2003/0225512 A1 * | 12/2003 | Kim | ................... | G01C 21/3492 701/533 |
| 2004/0204834 A1 * | 10/2004 | Manabe | ................. | G01C 21/34 701/454 |
| 2007/0050108 A1 * | 3/2007 | Larschan | ............... | G07C 5/085 701/33.4 |
| 2011/0144907 A1 * | 6/2011 | Ishikawa | ................ | G01C 21/30 701/532 |
| 2011/0218809 A1 * | 9/2011 | Suzuki | .................... | G10L 13/08 704/260 |
| 2012/0023397 A1 * | 1/2012 | Leichtberg | ........ | G06F 17/30241 715/234 |
| 2012/0126939 A1 * | 5/2012 | Chang | ................ | G07C 9/00563 340/5.53 |
| 2014/0200737 A1 * | 7/2014 | Lortz | ...................... | B60R 25/25 701/1 |
| 2014/0309813 A1 * | 10/2014 | Ricci | ........................ | B60Q 1/00 701/2 |
| 2014/0309863 A1 * | 10/2014 | Ricci | .................. | G01C 21/3484 701/36 |

(Continued)

*Primary Examiner* — Shardul Patel
(74) *Attorney, Agent, or Firm* — Frank A. MacKenzie; Bejin Bieneman

(57) ABSTRACT

An image of a vehicle user is captured. The image is compared to a corresponding account image in a preset profile. It is determined whether the image matches the corresponding account image. A destination is selected based on the user profile. A traffic report is generated based on the destination.

20 Claims, 3 Drawing Sheets

(56) References Cited

U.S. PATENT DOCUMENTS

2014/0309893 A1* 10/2014 Ricci .................... H04W 48/04
  701/49
2014/0310031 A1* 10/2014 Ricci ....................... B60Q 1/00
  705/5

* cited by examiner

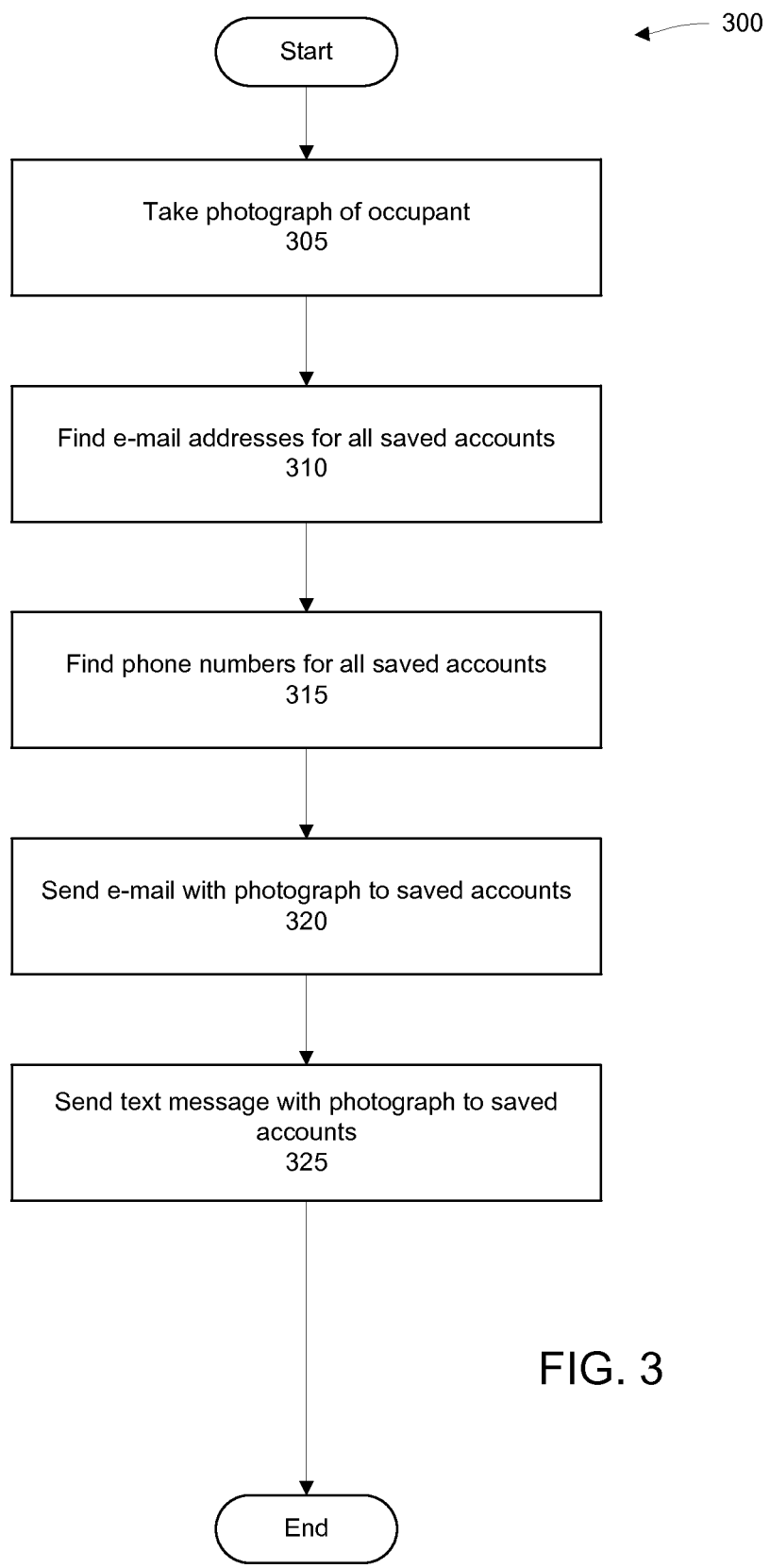

US 9,823,088 B2

CUSTOM NAVIGATIONAL DATA BASED ON USER RECOGNITION

BACKGROUND

Vehicles typically include various settings that can be adjusted for a particular user. For example, a user may wish to adjust a vehicle seat, mirrors, etc., based on the user's size. When multiple users have access to a vehicle, each of the users may require or desire different settings. Improved mechanisms are needed for identifying users and/or for providing custom settings.

BRIEF DESCRIPTION OF THE DRAWINGS

FIG. 3 is a flow diagram of an exemplary method for a vehicle anti-theft measure.

DETAILED DESCRIPTION

Multiple users may use a vehicle 101. Various vehicle 101 settings may be adjustable and/or individualized for each user. As disclosed herein, such settings, including a navigation system providing a preferred and/or individualized travel route, traffic information relating to such route, and the like, may be provided for a user entering a vehicle 101 based on a recognition of the user. For example, such recognition may be performed using data from a data collector 110 such as a camera in the vehicle 101 using facial recognition techniques. A profile for various users of a vehicle 101 may be stored in a data store in the vehicle 101, e.g., a memory of the computer 105. The profile may include various personalized settings, such as frequently traveled routes, preferred routes, preferred navigational options, times of travel, etc. Thus, once a user is recognized, traffic data relevant to a user's likely route of travel may be obtained and provided, and/or may be used to recommend a route to the user.

Figure 1:
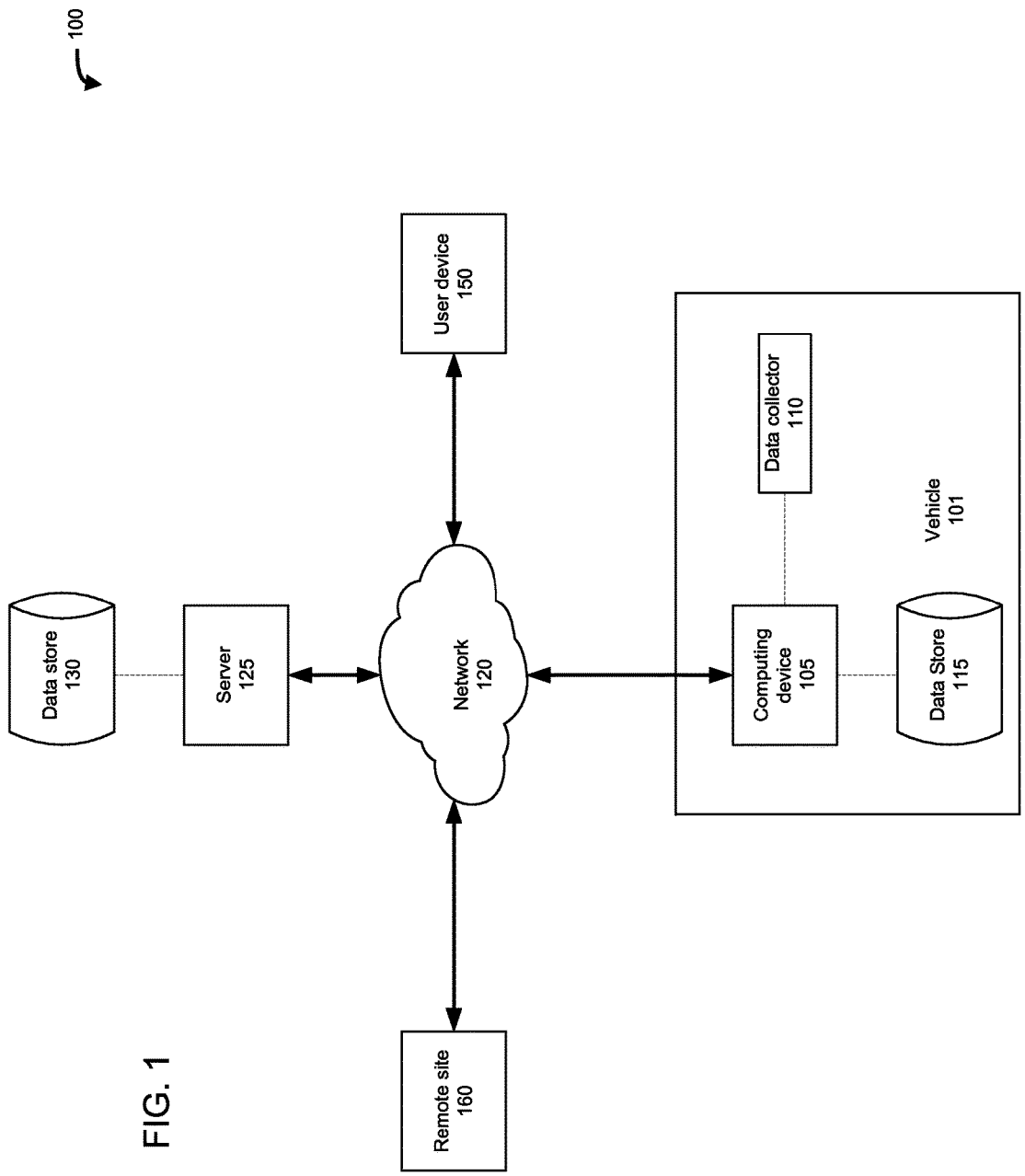
FIG. 1 is a block diagram of an exemplary system for implementing vehicle settings.

FIG. 1 illustrates a system 100 for providing customer navigational data based on performing facial recognition with respect to a vehicle 101 user. The vehicle 101 includes a computing device 105, a data collector 110, and a data store 115, e.g., one or more memories or media included in or communicatively coupled to the computing device 105.

The computing device 105 communicates over a network 120 with a remote computer server 125, the server 125 typically including or being communicatively coupled to a network data store 130. The network 120 may include one or more known networks and/or networking technologies, such as wireless communication networks (e.g., Bluetooth, IEEE 802.11, etc.), a cellular network, local area networks (LAN) and/or wide area networks (WAN), including the Internet, providing data communication services.

The data collector 110 collects identifying data of the user, e.g., an image. The data collector 110 may be any device suitable to collect identifying data, e.g. a camera. The data collector 110 is configured to send data to the computing device 105 and the data store 115, e.g., each of the computing device 105, the data collector 110, in the data store 115 may be communicatively coupled to a vehicle 101 network, such as a controller area network (CAN) bus or the like. As described in more detail below, using data from the data collector 110, the computer 105 is programmed to identify a user, and to retrieve user data from the data store 115. User profile data from the data store 115

The data store 115, the server 125, and the network data store 130 may be of any suitable type, e.g., hard disk drives, solid-state drives, or any other volatile or non-volatile media. The data store 115 and the network data store 130 may store data sent over the network 120.

One or more user devices 150 may be connected to the network 120. User devices 150 may include commonly carried devices such as one or more of cellular telephones, e.g., a smart phone or the like, tablet devices, laptop computers, etc.

A remote site 160, e.g. a third-party website or program, also connect to the network 120. The computing device 105 may send and receive data to and from one or more remote sites 160, e.g. traffic data, weather data, navigation, social media interactions, etc.

Figure 2:
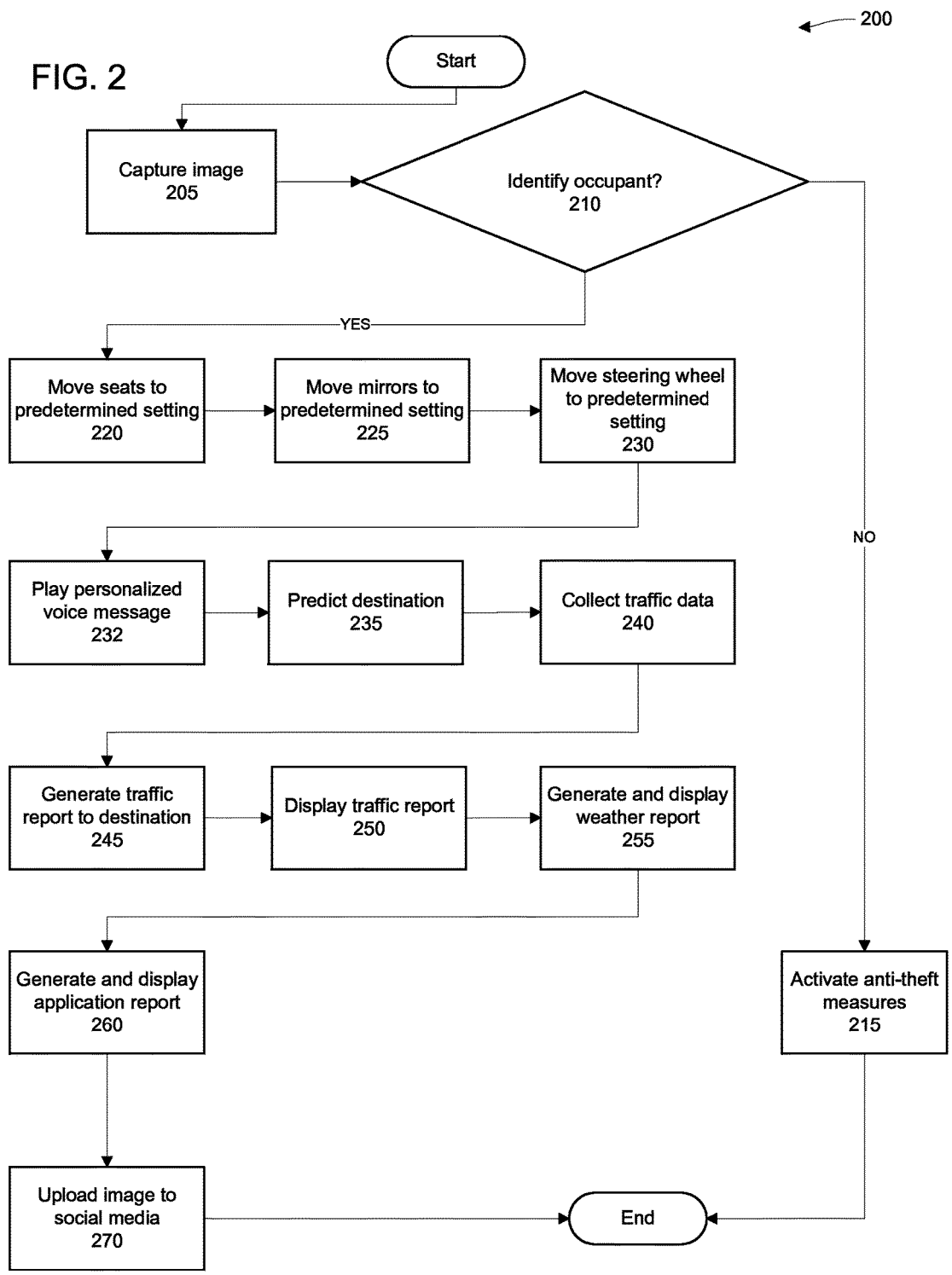
FIG. 2 is a flow diagram of an exemplary method for implementing vehicle settings.

FIG. 2 illustrates a process 200 for implementing preset vehicle settings based on user facial recognition. The process 200 starts in a block 205, where the data collector 110, captures an image of a vehicle user.

Next, in a block 210, the computing device 105 compares the image to images that have been stored in the data store 115 and included in respective user profiles to determine if the user is a pre-approved driver of the vehicle 101. Images could be stored in the data store 115 and included in a user profile via a variety of mechanisms. For example, a user could perform a set-up process whereby the computer 105 executes instructions to capture an image of the user, and the user provides input to associate the image with the user's profile, whereby the image would be included in the pre-stored images in the data store 115 as part of the user's profile.

In any event, if the image captured in the block 205 does not match any of the pre-stored images, the process 200 continues in a block 215. In the block 215, the computing device 105 activates anti-theft measures as described in FIG. 3 and the process 200 ends.

If the image captured in the block 205 is determined in the block 210 to match any of the stored images, the process 200 continues in a block 220. The data store 115 typically stores a plurality of user profiles. Each profile may store various preferences and/or usage data for a particular user, e.g., settings for seat positions, mirror positions, steering wheel positions, saved destinations, records of frequently traveled-to destinations, frequently traveled routes, frequent times of travel, etc. The settings may also include a maximum operating speed for the vehicle 101 for, e.g., an adolescent user. In the block 220, the computing device 105 searches the data store 115 for the seat position setting for the current user and moves a vehicle seat to the seat position setting.

Next, in a block 225, the computing device 105 searches the data store 115 for the mirror position setting for the current user and moves vehicle mirrors to the mirror position setting.

Next, in a block 230, the computing device 105 searches the data store 115 for the steering wheel position setting for the current user and moves a steering wheel to the steering wheel position setting.

Next in a block 232, the computing device 105 searches the data store 115 for a personalized voice message for the current user and plays the personalized voice message over a set of vehicle speakers. For example, such a voice mail message could welcome a user to the vehicle, provide the user with personalized information, such as traffic information relating to a usual destination, weather information, reminders concerning vehicle status (e.g., fuel level, tire pressure, and the like), etc.

Next, in a block 235, the computing device 105 searches the data store 115 for a predicted destination. The computing device 105 generates the predicted destination based on one or more criteria, e.g., destinations associated with the user's profile, and/or factors indicating that the user may be traveling to a particular destination, e.g., time of day, day of the week, attire (e.g., a person wearing a business suit may be headed to an office destination, but a person wearing blue jeans may be added to a recreational destination), etc. For example, if the time of day is morning and the day of the week is a weekday, the computing device 105 may predict a destination corresponding to the user's place of work. Similarly, if the time of day is evening, the computing device 105 may predict the saved destination corresponding to the user's place of residence.

Next, in a block 240, after predicting the destination based on the image captured in the block 205, the computing device 105 receives traffic data from the network 120, e.g. from the remote server 125 and/or a remote site 160. The traffic data may come from any suitable source, e.g., a manufacturer's crowdsourced proprietary database or a third-party database. The traffic data may include data relating to roadwork or construction on nearby roads and/or reported accidents.

Next, in a block 245, the computing device 105 generates a traffic report based on the traffic data and the predicted destination. Specifically, the computing device 105 determines a route from the user's current location to the destination, and based on the traffic data, determines the route that minimizes any or all of, e.g., distance traveled, time to destination, avoidance of highways, etc. The route may be determined to avoid areas congested with traffic, allowing the vehicle 101 to maintain a substantially constant speed on the route. For example, the computing device 105 may use data on local speed limits and stop light timing to determine a route that reduces the number of times that the vehicle 101 must stop or slow down, leading to increased fuel efficiency.

Next, in a block 250, the computing device 105 then presents the traffic data as a traffic report on a vehicle display. The vehicle display may be of any suitable type, e.g., a touchscreen display in a vehicle console. The traffic data may be received from, e.g. the server 125 may be updated with real-time or substantially real-time traffic data that the computing device 105 may obtain via the network 120. The computing device 105 may present the traffic report on the vehicle display as text and images and/or may read the traffic report vocally by any suitable method, e.g., using a known in-vehicle human machine interface (HMI) such as text-to-speech software and an audio speaker, display on an in-vehicle display monitor, etc.

Next, in a block 255, the computing device 105 receives weather data from the network 120 and present the weather data as a weather report on the vehicle display. The computing device 105 may also or alternatively read the weather report vocally. The weather data may be received from any suitable source, e.g., the remote site 160.

Next, in a block 260, the computing device 105 receives data from other personalized applications, e.g., news, sports, the user's schedule, and presents a report on the vehicle display. The computing device 105 may also or alternatively read the report vocally.

Next, in a block 270, the computing device 105 uploads the user's image to the remote site 160, e.g. the social media site or program, and the process 200 ends. The user may include a comment or status update with the image.

FIG. 3 shows a process 300 for an anti-theft measure based on user facial recognition. The process 300 starts in a block 305, where the data collector 110 captures the image of the user and stores the image in the data store 115.

Next, in a block 310, the computing device 105 searches the data store 115 for electronic mail addresses for all user profiles.

Next, in a block 315, the computing device 105 searches the data store 115 for phone numbers for all user profiles.

Next, in a block 320, the computing device 105 sends an electronic mail message including the image over the network 120 to all of the electronic mail addresses found at the block 310.

Next, in a block 325, the computing device 105 sends a text message including the image over the network 120 to all of the phone numbers found at the block 315, and the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

Computing devices 105 generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 200, one or more of the steps 220-270 could be omitted, of the steps could be executed in a different order than shown in FIG. 2. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:

1. A system, comprising a computer programmed to:
   capture an image of a user of a vehicle with a camera in the vehicle;
   retrieve a plurality of user profiles;
   compare the image to data stored in each user profile;
   upon determining that the image does not correspond to any user profile, identify a plurality of user devices, wherein each user device is associated with saved contact information for each user profile; and
   transmit a message including the image to each identified user device.

2. The system of claim 1, wherein the computer is further programmed to, upon determining that the image corresponds to one of the user profiles, select a predicted destination based at least in part on the user profile and obtain traffic data based on the predicted destination.

3. The system of claim 2, wherein the computer is further programmed to play a voice message including at least part of the traffic data.

4. The system of claim 2, wherein the computer is further programmed to generate a route to the predicted destination to allow the vehicle to maintain a substantially constant speed.

5. The system of claim 1, wherein each user profile includes a plurality of pre-stored destinations.

6. The system of claim 4, wherein a predicted destination is chosen from the plurality of destinations based at least in part on a current time.

7. The system of claim 1, wherein the computer is further programmed to generating a weather report and presenting the weather report on the display.

8. The system of claim 1, wherein the computer is further programmed to send the image to a social media website.

9. The system of claim 1, wherein the computer is further programmed to generate a traffic report and present the traffic report to the user on a display.

10. The system of claim 1, wherein the wherein the computer is further programmed to, upon determining that the image does not correspond to any user profile, transmit the message to all user devices associated with the saved contact information in all of the user profiles.

11. A method, comprising:
    capturing an image of a user of a vehicle with a camera in the vehicle;
    retrieving a plurality of user profiles;
    comparing the image to data stored in each user profile;
    upon determining that the image does not correspond to any user profile, identifying a plurality of user devices, wherein each user device is associated with saved contact information for each user profile; and
    transmitting a message including the image to each identified user device.

12. The method of claim 11, further comprising upon determining that the image corresponds to one of the user profiles, selecting a predicted destination based at least in part on the user profile and obtain traffic data based on the predicted destination.

13. The system of claim 12, further comprising playing a voice message including at least part of the traffic data.

14. The method of claim 12, further comprising generating a mute to the predicted destination to allow the vehicle to maintain a substantially constant speed.

15. The method of claim 11, wherein each user profile includes a plurality of destinations.

16. The method of claim 15, wherein a predicted destination is chosen from the plurality of destinations at least in part on a current time.

17. The method of claim 11, further comprising generating a weather report and presenting the weather report on a display.

18. The method of claim 11, further comprising sending the image to a social media website.

19. The method of claim 11, further comprising generating a traffic report and presenting the traffic report to the user on a display.

20. The method of claim 11, further comprising, upon determining that the image does not correspond to any user profile, transmitting the message to all user devices associated with the saved contact information in all of the user profiles.

* * * * *

UNITED STATES PATENT AND TRADEMARK OFFICE
CERTIFICATE OF CORRECTION

PATENT NO. : 9,823,088 B2
APPLICATION NO. : 14/715954
DATED : November 21, 2017
INVENTOR(S) : Aurelien Pierre Christian Delaruelle It is certified that error appears in the above-identified patent and that said Letters Patent is hereby corrected as shown below:

In the Claims

Column 6, in Line 34, replace "a mute to the" with -- a route to the --.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*